United States Patent [19]

Webber

[11] 4,445,211
[45] Apr. 24, 1984

[54] ARRANGEMENT FOR MULTIPLE CUSTOM CALLING

[75] Inventor: Robert C. Webber, Glendale, Ariz.

[73] Assignee: GTE Automatic Electric Labs Inc., Northlake, Ill.

[21] Appl. No.: 316,252

[22] Filed: Oct. 29, 1981

[51] Int. Cl.³ .............................................. H04Q 11/04
[52] U.S. Cl. ................................... 370/62; 179/18 B; 179/18 BC
[58] Field of Search ................ 370/62, 63; 179/18 B, 179/18 BC, 18 BG

[56] References Cited

U.S. PATENT DOCUMENTS

| 3,504,123 | 3/1970 | Fischer et al. | 370/62 |
| 3,517,135 | 6/1970 | Fisch et al. | 370/62 |
| 3,967,070 | 6/1976 | Srivastava et al. | 370/62 |
| 3,997,731 | 12/1976 | Wilmot et al. | 179/18 B |

FOREIGN PATENT DOCUMENTS

| 52-20712 | 2/1977 | Japan | 179/18 BG |
| 56-56063 | 5/1981 | Japan | 179/18 BG |

OTHER PUBLICATIONS

"ITT 1240 Digital Exchange", by J. M. Cotton, Electrical Communication, vol. 54, No. 3, 1979, pp. 215-224.

Primary Examiner—Douglas W. Olms
Attorney, Agent, or Firm—Frank J. Bogacz; Robert J. Black

[57] ABSTRACT

The arrangement described herein provides for simple control and minimal program impact of a central office switching system for interfacing multiple custom calls. This arrangement employs a few simple trunks connected in a loop around configuration. The arrangement shown considers the connection of a three way calling subscriber to a call waiting subscriber who is actively engaged in a prior telephone call.

4 Claims, 4 Drawing Figures

ARRANGEMENT FOR MULTIPLE CUSTOM CALLING

CROSS-REFERENCE TO RELATED APPLICATIONS

The present application is related to copending U.S. patent applications Ser. Nos. 316,254; 316,255; 316,268; and 316,377, having the same inventive entity and being assigned to the same assignee.

BACKGROUND OF THE INVENTION (1) Field of the Invention

The present invention pertains to multiple custom telephone calling features and more particularly to an arrangement for controlling these custom calling features which interface with one another in a common central office.

(2) Description of the Prior Art

As computerization was introduced into telephone switching offices, it was understood that more complex functions could be provided by the switching office. Among these functions are such features as special ticketing and billing arrangements and custom calling features such as three way calling, call forwarding, speed calling, and call waiting. To implement each of these special custom calling features complex hardware in the form of trunk circuits and complex programs in the central processing unit of the switching office are required.

When these custom calling features interface with one another further complexity is added to both the trunking arrangement and the program. Among these features the more complex are call waiting and three way calling. These features are the most complex since they require the greatest amount of hardware and program to handle their operation. Call waiting service is defined as: A call waiting subscriber will hear a short tone, if he is already using his line and the second party is attempting to reach him. The second party receives normal ring back tone and the line is split, so that only the subscriber to be called will hear the short tone. The tone will be repeated in 10 seconds as a reminder, and if unanswered, the second party will receive ring back tone. If the subscriber wants to end his first call he simply hangs up and his phone will ring with the second party on the line. If he wants to hold the first party while answering the second, he presses the hookswitch for one-half a second. With this method he can switch between parties at will.

Three way calling service is defined as: A three way calling subscriber can add a third party to an existing conversation. While the subscriber is conversing with another party, a third party can be added to the conversation by depressing his hookswitch for one-half a second. This puts the original party on hold, and the subscriber will hear a special dial tone (3 spurts of tone followed by regular dial tone). He can then dial the third party and hold a private conversation with the third party. To establish the three way connection the subscriber must again depress its hookswitch for one-half a second. If the third party did not answer or if the subscriber wants to drop a third party from the three way call, he simply depresses his hookswitch for one-half a second and the original parties are re-established (and the subscriber may again establish a three way call). To disconnect, the subscriber simply hangs up and all connections will be broken down.

These custom calling features required specialized trunk arrangements and complex program for the manipulation of the connection of parties in reponse to hookswitch flashing. Arrangements for connecting custom calling subscribers individually are shown in an article entitled "Custom Calling Services on No. 1 EAX" by J. D. McLean in the GTE Automatic Electric Technical Journal, July, 1976, Vol. 15-No. 3. This article shows basic configurations for the establishment of call waiting and three way calling custom features as independent calls. This article shows the special trunks and junctors which were developed for the implementation of these custom calling features. However, the article does not deal with the interconnection of these custom calling features to one another and the resulting complexity added by this arrangement.

One manner in which to handle the problem of interacting custom calls is to prevent subscribers from calling other subscribers who have active custom calling features. This is not a suitable solution since certain subscribers would be unable to reach whomever they chose to call. Another solution is to provide complex trunks or to increase the logic of the controlling program to accommodate all the interactions of two interacting custom calls. However this situation resulted in expensive trunk arrangements which are undesirable since they increase the cost of the custom calling feature to the subscriber.

The above mentioned problems are further compounded when both of the interacting custom calls are made from the same switching office. This situation means that one switching office must control the operation of multiple custom calls making the interacting decisions very complex.

Accordingly it is the object of the present invention to provide a simple trunking arrangement and program for the operation of multiple interacting custom calls within a particular telephone switching office for a three way calling subscriber, initiating a three way call to a call waiting subscriber who is busy in an existing call.

SUMMARY OF THE INVENTION

The present invention comprises an arrangement for multiple custom calling telephone calls within a switching office. Two telephone subscribers with custom calling service features are connected via a switching network of the office in two independent telephone calls to two other subscribers.

A first one of the custom calling subscribers, then activates his custom calling feature, three way calling for example, to place a three way call to the second custom calling subscriber, a call waiting subscriber. Thereby, the two custom calls now have a common point of control. The handling of the interconnection of these two custom callers requires complex logic, since many combinations of hookswitch flashing and signaling must be taken into account by the program.

In the present arrangement this problem is eliminated by separating the two custom calling subscribers. In the above example, the three way calling subscriber is connected to the switching network via a three port trunk circuit. This trunk circuit provides for the interconnection of up to three subscribers with allowance for control of the interconnection of these subscribers via hookswitch flashes from the custom calling subscriber.

When the interconnection of the two custom calling subscribers is initiated a second trunk circuit is seized by the program and connected between the first and second custom callers. Thereby, the two telephone subscribers with the active custom calling features are isolated via the second trunk circuit and the corresponding hookswitch flashes of each subscriber can more simply be determined for each call. The program can monitor each caller's hookswitch flashes independently instead of complex logic required for combinations of hookswitch flashes where two custom calls are monitored together.

The second trunk circuit is connected to the switching network in a simple loop around configuration between an incoming and outgoing portions of the network.

The program logic associated with the first custom caller treats the call as a connection between a custom caller, another POTS (plain old telephone service) subscriber and a subscriber connected to an outgoing trunk (ie. the loop around trunk). This outgoing trunk subscriber appears to the program logic a subscriber in another switching center and therefore simplifies the handling of the first custom call by the program logic.

Similarly, the second custom call appears to the program logic as a connection between a custom caller, another POTS subscriber and a subscriber connected to an incoming trunk. Therefore, each custom call can be handled simply without the complexity of combinations of signaling by directly connection one custom calling subscriber to another custom calling subscriber.

The program logic must first detect a multiple custom call situation. Then selection must be made of any three port trunk circuits and loop around trunk circuits. The network connection must be reconfigured to add the necessary loop around trunk. As a result, the two custom calls are now handled by separate program logic thereby, simplifying the task of each call handling program.

DESCRIPTION OF THE PREFERRED EMBODIMENT

Figure 1:
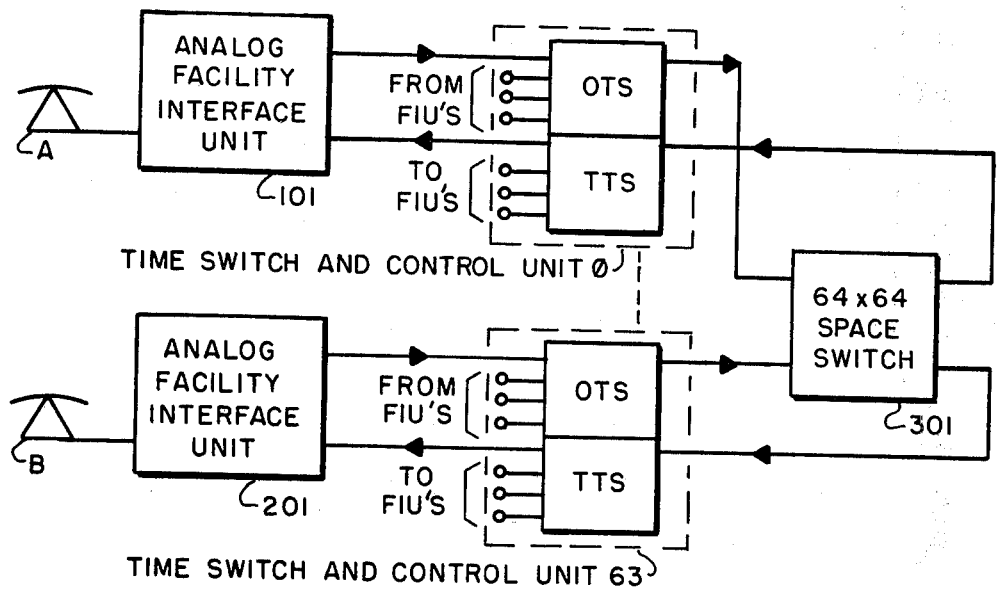
FIG. 1 is a block diagram depicting the overall network structure of associated with the present invention.

FIG. 1 is a block diagram showing a T-S-T network of a digital switching center for switching a local to local telephone call between POTS subscribers. Subscriber A is connected via an analog facility interface unit (FIU) 101. The analog FIU 101 has a PCM voice connection to time switch and control unit (TCU) 0. Each TCU has 2 time stages associated with it, an originating time stage (OTS) and a terminating time stage (TTS).

A connection is made from the OTS of a particular TCU to the 64 by 64 space switch 301. Then, a connection is established between the space switch 301 and the terminating time stage of TCU 63, for example. Subscriber B is connected through analog FIU 201 to the TTS of TCU 63.

Next a voice transmission link is established from subscriber B to subscriber A. This communication link is established via FIU 201, the OTS of TCU 63, through space switch 301, through the TTS of TCU 0, through analog FIU 101 to subscriber A. As a result, a full talking path has been established between subscribers A and B.

Figure 2:
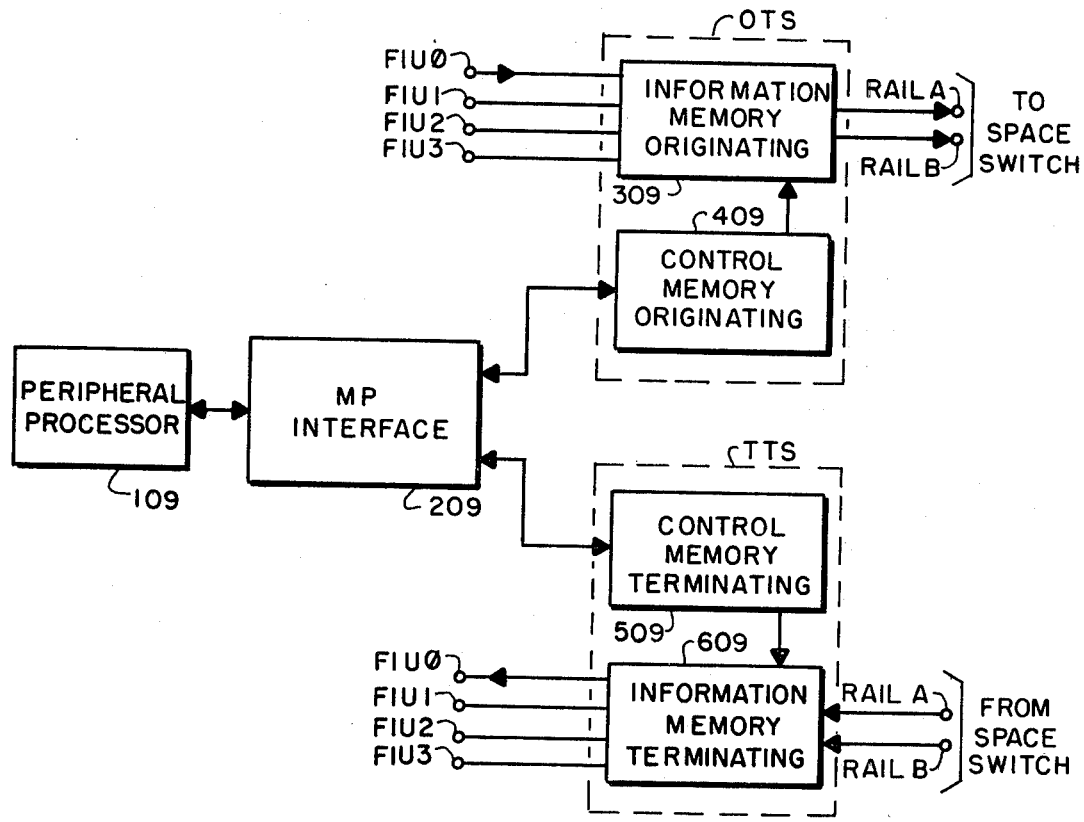
FIG. 2 is a block diagram depicting the originating and terminating time stages of the present invention and their connection to the central processing unit.

FIG. 2 shows the connection of a particular TCU to a corresponding microprocessor CPU 109. Each stage of a time and control unit includes an information memory and a control memory. For example, the originating time stage OTS shown includes an information memory 309 and a control memory 409. Microprocessor interface 209 connects the CPU 109 to the control memories 409 and 509.

The information memories 309 and 609 each contain information memory units with PCM samples. Up to four FIU's may be connected to each TCU. These FIU's may be analog line FIU's, connecting telephone subscribers to the network, as shown in FIG. 1 or analog trunk FIU's for connecting calls to service or outgoing trunk circuits.

Figure 3B:
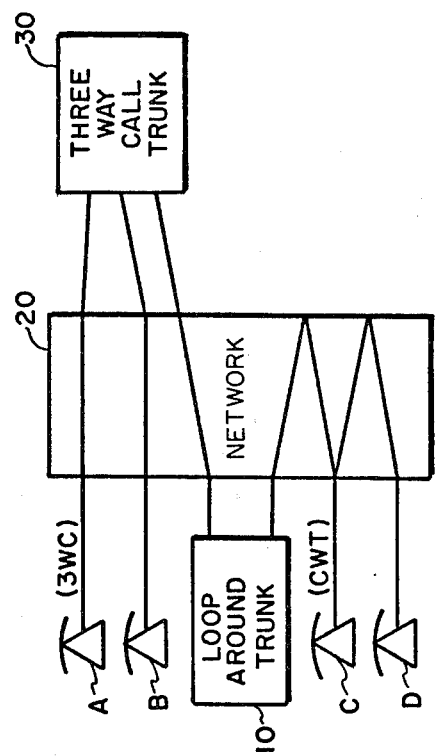
FIG. 3B is a block diagram depicting the multiple custom calling network arrangement in accordance with the present invention.
Figure 3A:
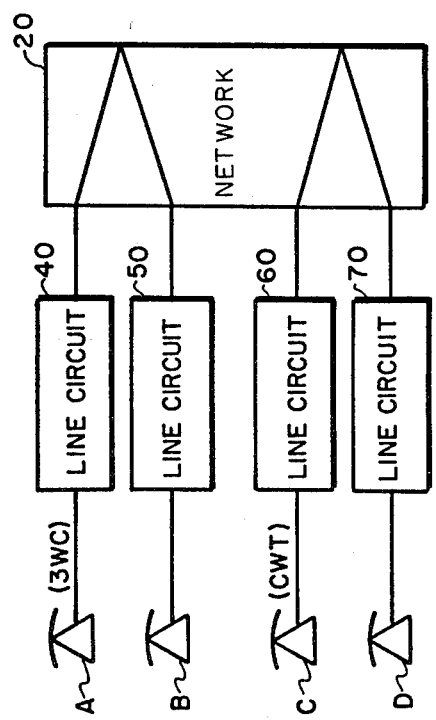
FIG. 3A is a block diagram depicting the two custom callers without their custom calling features active.

Referring now to FIG. 3A, network 10 includes such elements as analog FIU's, time switch and control units, which further include information and control memories, and a space switching stage. Subscriber A, who is a three way calling subscriber, is shown connected through network 20 to subscriber B, a POTS subscriber.

Subscriber C, a call waiting subscriber, is connected via network 20 to subscriber D, a POTS subscriber. Both calls (call one between subscribers A and B and call two between subscribers C and D) are connected via the same switching center. These calls are not in custom calling service at this time.

As shown in FIG. 3B when subscriber A activates his three way calling feature via a hookswitch flash, the program of the CPU detects the request for a three way call. The called subscriber C is examined to determine the custom calling status of this subscriber. Since subscriber C is a call waiting subscriber and calling subscriber A is a three way calling subscriber, there is a multiple custom calling situation and special handling must occur. The program then connects three way call trunk 30 while momentarily holding subscribers A and B.

Next, the CPU's stored program selects an alternate route through switching network 20 to loop around trunk 10, instead of selecting a path through switching network 20 to subscriber C directly. The outpulsing of subscriber C's digits takes place analogous to a conventional incoming trunk. That is, the loop around trunk 10 appears as an incoming trunk while performing the outpulsing operation.

As a result of the connection of loop around trunk 10, the two custom calls (the three way call between subscribers A, B and C and the call waiting call between subscribers A, C and D) are isolated from one another. Now, hookswitch flashes of subscriber A are interpreted by the CPU's stored program via basic sensors associated with each subscriber's line circuit and not forwarded through loop around trunk 10. Subscriber A may connect himself with subscribers B and C in a conference arrangement as three way calling is defined above.

Since the hookswitch flashes of subscriber C are separated from those of subscriber A and vice versa, the basic logic design of all the system's trunks, such as the three way call trunk 30, are greatly simplified. This is contrasted with a substantially more complex arrangement of three way call trunk 30 required for handling multiple hookswitch flashes for both custom calling subscribers A and C.

The loop around trunk makes the two custom calls appear as though they are in different switching centers connected by a trunk circuit. As a result, the control trunk logic is minimized. In addition, the program logic required for outgoing custom calls and intra-office custom calls may be similar resulting in the great savings of program logic. The program logic saved via loop around this configuration is equivalent to approximately 1000 manhours of design development time.

It is to be noted that the complex situation of subscriber disconnects during multiple custom calls is handled as though only a single custom call was involved. This is a further result of the separation via loop around trunk 10 of the two custom calls.

Although a preferred embodiment of the invention has been illustrated and that form described in detail, it will be readily apparent to those skilled in the art that various modifications may be made therein; without departing from the spirit of the invention or from the scope of the appended claims.

What is claimed is:

1. In a telephone switching office, an arrangement for multiple custom calling comprising:
    a CPU;
    a switching network connected to said CPU;
    a plurality of telephone subscribers connected to said switching network including at least a first and second custom calling subscriber, each custom calling subscriber engaged in an active telephone call with a third and fourth telephone subscriber respectively;
    means for detecting a request for a three way call from said first to said second custom calling subscriber, said means for detecting connected to said switching network and being operated to transmit said request to said CPU;
    means for holding said first and second custom calling subscribers, said means for holding being connected between said first and second subscribers and said switching network and connected to said CPU and being operated in response to said request for said three way call;
    means for alternately routing connected to said switching network and to said CPU, said means for alternately routing between operated in response to said CPU to connect said first and second custom calling subscriber with said third subscriber in said three way call;
    means for connecting telephone subscribers within the same switching office, said means for connecting being connected to said means for alternately routing via said switching network and to said CPU, said means for connecting being operated in response to said means for alternately routing to provide for connecting said second custom calling subscriber with said first custom calling subscriber and said third subscriber while rendering each of said active telephone calls independently controlled.

2. An arrangement for multiple custom calling as claimed in claim 1, wherein said switching network comprises a digital switching network.

3. An arrangement for multiple custom calling as claimed in claim 2, wherein said digital switching network comprises a timespacetime digital switching network.

4. An arrangement for multiple custom calling as claimed in claim 1, wherein said connection of each of said plurality of telephone subscribers includes a line circuit.

* * * * *